(12) United States Patent
Lee

(10) Patent No.: US 8,976,082 B2
(45) Date of Patent: Mar. 10, 2015

(54) METHOD AND SYSTEM FOR SYNCHRONIZING MARK ON ELECTRONIC MAP AND RECORDING MEDIUM USING THE SAME

(75) Inventor: Yu-Cheng Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 628 days.

(21) Appl. No.: 12/488,600

(22) Filed: Jun. 22, 2009

(65) Prior Publication Data

US 2010/0019990 A1    Jan. 28, 2010

(30) Foreign Application Priority Data

Jul. 24, 2008    (TW) ............................... 97128126 A

(51) Int. Cl.
- G09G 5/12 (2006.01)
- H04L 29/08 (2006.01)
- G01C 21/36 (2006.01)
- H04W 4/02 (2009.01)
- H04W 4/18 (2009.01)
- H04W 4/20 (2009.01)

(52) U.S. Cl.
CPC .......... *H04L 67/1095* (2013.01); *G01C 21/362* (2013.01); *H04W 4/02* (2013.01); *H04W 4/18* (2013.01); *H04W 4/20* (2013.01); *H04L 67/18* (2013.01)
USPC .......................................... 345/2.2; 345/213

(58) Field of Classification Search
None
See application file for complete search history.

(56) References Cited

U.S. PATENT DOCUMENTS

| | | | |
|---|---|---|---|
| 6,636,802 B1 * | 10/2003 | Nakano et al. | 701/532 |
| 7,271,742 B2 | 9/2007 | Sheha et al. | |
| 2001/0027375 A1 * | 10/2001 | Machida et al. | 701/209 |
| 2002/0091793 A1 * | 7/2002 | Sagie | 709/217 |
| 2003/0093221 A1 * | 5/2003 | Adachi | 701/208 |
| 2003/0182052 A1 * | 9/2003 | DeLorme et al. | 701/201 |
| 2004/0054428 A1 * | 3/2004 | Sheha et al. | 700/56 |

(Continued)

FOREIGN PATENT DOCUMENTS

| | | |
|---|---|---|
| CN | 1957383 | 5/2007 |
| EP | 1755096 A1 * | 2/2007 |

(Continued)

OTHER PUBLICATIONS

Topo USA 5.0 User Guide, 2004, p. 79.*

(Continued)

*Primary Examiner* — Grant Sitta
*Assistant Examiner* — Kirk Hermann
(74) *Attorney, Agent, or Firm* — Jianq Chyun IP Office

(57) ABSTRACT

A synchronizing method and a system for marks on electronic maps and a recording medium using the same are provided. In the present synchronizing method, an input signal is received by a first electronic device, so as to draw a mark on the electronic map displayed thereon. The mark is then converted into positioning information of a plurality of positioning points on the electronic map and transmitted to a second electronic device via a wireless transmission network, wherein the positioning information is used for drawing the positioning points on the electronic map displayed on the second electronic device so as to reconstruct the mark. Accordingly, the mark on the electronic map of both communication ends can be synchronized.

20 Claims, 7 Drawing Sheets

(56) References Cited

U.S. PATENT DOCUMENTS

| | | | |
|---|---|---|---|
| 2004/0225437 A1* | 11/2004 | Endo et al. | 701/209 |
| 2005/0034062 A1* | 2/2005 | Bufkin et al. | 715/512 |
| 2005/0288036 A1* | 12/2005 | Brewer et al. | 455/456.2 |
| 2006/0095201 A1* | 5/2006 | Chao | 701/208 |
| 2006/0136127 A1* | 6/2006 | Coch et al. | 701/208 |
| 2006/0271287 A1* | 11/2006 | Gold et al. | 701/211 |
| 2007/0061073 A1* | 3/2007 | Kuo et al. | 701/211 |
| 2007/0233367 A1 | 10/2007 | Chen et al. | |
| 2007/0294365 A1* | 12/2007 | Cho et al. | 709/217 |
| 2009/0276154 A1* | 11/2009 | Subramanian et al. | 701/213 |
| 2011/0117878 A1* | 5/2011 | Barash et al. | 455/404.2 |

FOREIGN PATENT DOCUMENTS

| | | | |
|---|---|---|---|
| TW | 1274303 | * | 9/2005 |
| TW | I274303 | | 2/2007 |
| TW | 200823431 | | 6/2008 |

OTHER PUBLICATIONS

Barycenter coordinates (astronomy), en.wikipedia.org/wiki/Barycentric_coordinates_(astronomy), printed on Mar. 17, 2014.*

* cited by examiner

METHOD AND SYSTEM FOR SYNCHRONIZING MARK ON ELECTRONIC MAP AND RECORDING MEDIUM USING THE SAME

CROSS-REFERENCE TO RELATED APPLICATION

This application claims the priority benefit of Taiwan application serial No. 97128126, filed on Jul. 24, 2008. The entirety of the above-mentioned patent application is hereby incorporated by reference herein and made a part of this specification.

BACKGROUND

With continuing progress and improvement on electronic technology, compact-sized automobile computers, positioning devices, and electronic devices such as cellular phones and personal digital assistants (PDAs), have continuously progressed. In current market, electronic devices are integrated with multiple functions so as to enhance their competitiveness. Besides functions of photographing, telephoning, and internet surfing, currently, Global Positioning System (GPS), electronic map, and navigation system are also integrated in handheld communication devices, automobile computers, and positioning devices. Users can get their positions by using the GPS anytime and find the best route to the destination through the plan and guidance of navigation systems so as to arrive at the destination fast and safely.

However, GPS is limited to be used for detecting users' positions rather than detecting the others' positions. Thus, if a user wants to guide another person to approach to where he/she is, he/she can lead the person to find the route only in the situation that both ends are equipped with GPS, and the user informs the person about his/her positioning information of current position or uploads the same to device of the person; otherwise, the user has to guide the person by direct oral description.

For example, as a visitor visits a friend without knowing where the friend's home is, the friend has to guide the visitor to his/her home by telephone. However, the visitor has to spend much time on searching the way to the destination because of being not familiar with the surroundings around the friend's home. On the other hand, the friend could fail to guide the visitor properly as he/she does not know the exact position of the visitor.

SUMMARY OF THE APPLICATION

Based on the above, there is a need to develop a method for facilitating both ends to know where the opposite end is and guiding the correct direction.

In view of the foregoing, the present application provides a method for synchronizing marks on electronic maps, by which marks on electronic maps of both communication ends are synchronized so as to provide with convenient way for communication.

The present application provides a system for synchronizing marks on electronic maps, by which a mark on an electronic map is converted into positioning information by a transmitting end, and then the mark is reconstructed by a receiving end based on the received positioning information.

The present application provides a recording medium, which records a computer program to be loaded into an electronic device for execution so as to achieve synchronization of marks on electronic maps of both ends.

The present application provides a method for synchronizing marks on electronic maps, which is adapted to synchronizing marks on electronic maps displayed on a first electronic device and a second electronic device. The method comprises steps as follows. First, the first electronic device receives an input signal and draws a mark on an electronic map displayed thereon accordingly. After that, the first electronic device converts the mark into positioning information of a plurality of positioning points on the electronic map, and transmits the same to the second electronic device via a wireless transmission network. Then, the second electronic device draws positioning points on the displayed electronic map based on the positioning information so as to reconstruct the mark.

In an example of the present application, the step of converting the mark into the positioning information of the positioning points on the electronic map and transmitting the same to the second electronic device further comprises transmitting a scaling ratio of the electronic map displayed on the first electronic device to the second electronic device.

In an example of the present application, the step of drawing the positioning points on the electronic map displayed on the second electronic device based on the positioning information so as to reconstruct the mark further comprises adjusting the size of the electronic map based on the scaling ratio and drawing positioning points on the adjusted electronic map so as to reconstruct the mark.

In an example of the present application, the step of transmitting the scaling ratio of the electronic map of the first electronic device to the second electronic device further comprises transmitting coordinates of the center point of the electronic map displayed on the first electronic device to the second electronic device.

In an example of the present application, the step of drawing the positioning points on the electronic map displayed on the second electronic device based on the positioning information so as to reconstruct the mark further comprises adjusting the position of the electronic map based on the coordinates of the center point and adjusting the size of the displayed electronic map based on the scaling ratio and drawing the positioning points on the adjusted electronic map so as to reconstruct the mark.

In an example of the present application, the step of drawing the positioning points so as to reconstruct the mark of the adjusted electronic map to be displayed on the second electronic device comprises adjusting the size of the displayed electronic map so that a display area of the electronic map covers the positioning points corresponding to the positioning information, and drawing positioning points on the adjusted electronic map so as to reconstruct the mark.

In an example of the present application, upon the step of drawing positioning points on the displayed electronic map so as to reconstruct the mark, the electronic map comprising the mark is further captured and saved as a geo-picture.

In an example of the present application, the mark comprises marking lines, signs, or icons drawn by a user.

In an example of the present application, the wireless transmission network comprises infrared ray, radio, bluetooth, Wireless Fidelity (Wi-Fi), Global System for Mobile Communication (GSM), Personal Handy-phone System (PHS), or Code Division Multiple Access (CDMA).

In an example of the present application, the first electronic device and second electronic device comprise automobile computers comprising Car PC, positioning devices comprising navigation device, or handheld electronic devices comprising cellular phones, Personal Digital Assistants (PDAs), PDA phones, digital cameras, music players, or game devices.

In another aspect, the present application also provides a method for synchronizing marks on electronic maps, which is adapted to synchronizing marks on electronic maps displayed on a first electronic device and a second electronic device. The method comprises steps as follows. First, the first electronic device receives an input signal and draws a mark on an electronic map displayed thereon accordingly. After that, the first electronic device converts the mark into positioning information of a plurality of positioning points on the electronic map, and transmits the same to the second electronic device via a wireless transmission network, wherein the positioning information is used for drawing the positioning points on the electronic map displayed on the second electronic device so as to reconstruct the mark.

In an example of the present application, the step of converting the mark into the positioning information of the positioning points on the electronic map and transmitting the same to the second electronic device further comprises transmitting a scaling ratio of the electronic map displayed on the first electronic device to the second electronic device.

In an example of the present application, wherein the scaling ratio is used for adjusting the size of the electronic map displayed on the second electronic device.

In an example of the present application, the step of transmitting the scaling ratio of the electronic map of the first electronic device to the second electronic device further comprises transmitting coordinates of the center point of the electronic map displayed on the first electronic device to the second electronic device.

In an example of the present application, wherein the coordinates of the center point adjusting the position of the electronic map displayed on the second electronic device.

The present application also provides a system for synchronizing marks on electronic maps, comprising a first electronic device and a second electronic device. The first electronic device comprises a first display unit, an input unit, a converting module, and a transmission unit. The first display unit is used to display a first electronic map. The input unit is used to receive an input signal so as to draw a mark on the first electronic map. The converting module is used to convert the mark into positioning information of a plurality of positioning points on the first electronic map. The first transmission unit is used to output the positioning information of the positioning points via a wireless transmission network. On the other hand, the second electronic device comprises a second display unit, a second transmission unit, and a drawing module. The second display unit is used to display a second electronic map. The second transmission unit is used to receive the positioning information of the positioning points output from the first electronic device via the wireless transmission network. The drawing module is used to draw the positioning points on the second electronic map displayed on the second display unit based on the positioning information so as to reconstruct the mark.

In an example of the present application, the first transmission unit of the first electronic device is further used to transmit a scaling ratio of the first electronic map to the second electronic device so that the size of the displayed second electronic map is adjusted by the drawing module of the second electronic device based on the scaling ratio, and then, the positioning points are drawn on the adjusted second electronic map so as to reconstruct the mark.

In an example of the present application, the first transmission unit of the first electronic device is further used to transmit coordinates of the center point of the first electronic map to the second electronic device so that the position of the displayed second electronic map is adjusted by the drawing module of the second electronic device based on the coordinates of the center point, and then, the positioning points are drawn on the adjusted second electronic map so as to reconstruct the mark.

In an example of the present application, the drawing module of the second electronic device is further used to adjust the size of the second electronic map so that a display area of the second electronic map covers the positioning points corresponding to the positioning information, and the positioning points are drawn on the adjusted second electronic map so as to reconstruct the mark.

In an example of the present application, the second electronic device further comprises a capturing module, which is used to capture the second electronic map comprising the mark and save the same as a geo-picture.

In another aspect, the present application also provides a system for synchronizing marks on electronic maps, comprising a first electronic device and a second electronic device. The first electronic device comprises a first display unit, an input unit, a converting module, and a transmission unit. The first display unit is used to display a first electronic map. The input unit is used to receive an input signal so as to draw a mark on the first electronic map. The converting module is used to convert the mark into positioning information of a plurality of positioning points on the first electronic map. The first transmission unit is used to output the positioning information of the positioning points via a wireless transmission network, wherein the positioning information of the positioning points is used for drawing the positioning points on a second display unit of the second electronic device so as to reconstruct the mark on a second electronic map displayed on the second display unit.

The present application further provides a recording medium, which records a computer program to be loaded into an electronic device for executing the method for synchronizing marks on the electronic maps. The computer program is consisted of a plurality of program code segments, such as program code segments of creating organization chart, signing forms, configuration, and deployment. Then, when the program code segments are loaded into the electronic device and executed, the steps of the method for synchronizing marks on the electronic maps and functions of the system for synchronizing marks on the electronic maps are executed.

The present application converts a mark drawn by a user on an electronic map into positioning information of a plurality of positioning points and transmits the same to the other end so as to reconstruct the mark originally drawn by the user. By this manner, synchronization of the mark on the electronic maps of both ends is achieved. Moreover, coordinates of the center point of the electronic map and scaling ratios are also transmitted while transmitting the positioning information so that synchronization of scaling ratios of the electronic maps of both ends is also achieved.

To make the above and other objectives, features, and advantages of the present application more comprehensible, examples accompanied with figures is detailed as follows.

BRIEF DESCRIPTION OF THE DRAWINGS

The accompanying drawings are comprised to provide a further understanding of the application, and are incorporated in and constitute a part of this specification. The drawings illustrate examples of the application and, together with the description, serve to explain the principles of the application.

DESCRIPTION

The present application is used for the situation that both communication ends are installed with an electronic map. In the present application, a mark drawn on an electronic map by a user of one end is converted into positioning information of a plurality of positioning points. Then, a method of transmitting the positioning information is adopted to replace a method of transmitting images so as to transmit the information related to the mark on the electronic map to the other end. Due to the small data size of the positioning information, the present application may help the user of the other end to reconstruct the mark on the electronic map quickly so that synchronization of marks on electronic maps of both ends is achieved. Based on the concept described above, the present application provides a method and a system for synchronizing marks on electronic maps and a recording medium using the same. In order to make the present application more comprehensible, examples are described below as the examples to prove that the application can actually be realized.

Figure 1:
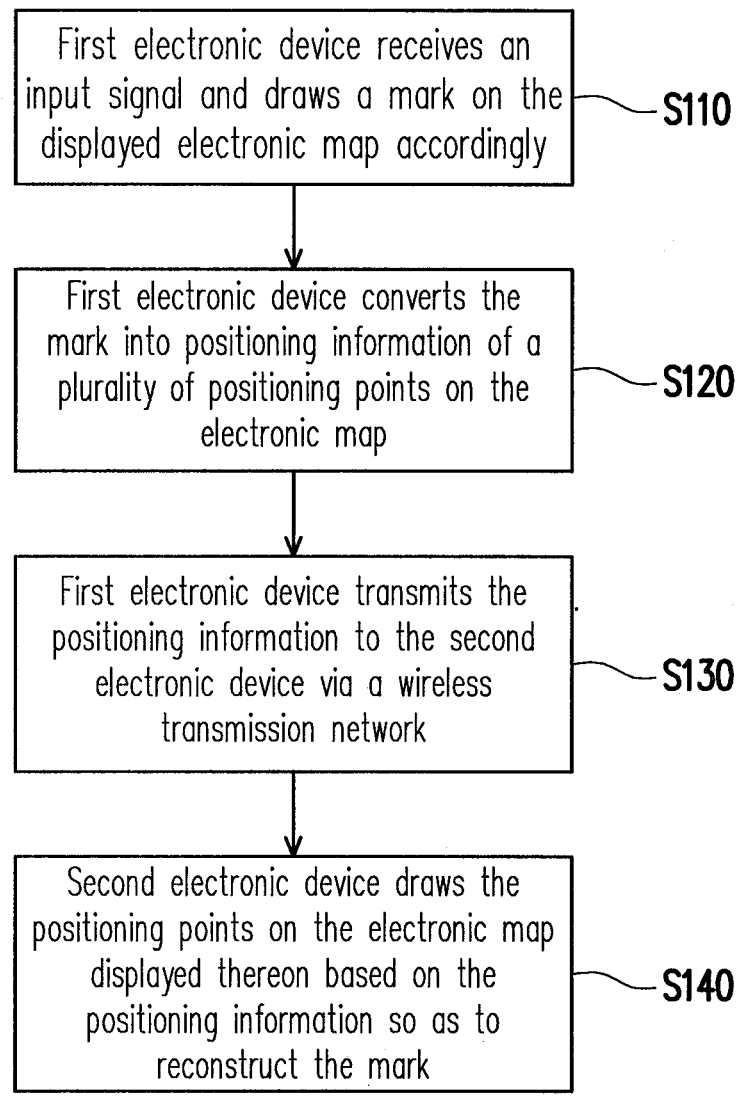
FIG. 1 is a flowchart illustrating a method for synchronizing marks on electronic maps based on an example of the present application.

FIG. 1 is a flowchart illustrating a method for synchronizing marks on electronic maps based on an example of the present application. Referring to FIG. 1, the present example is adapted to synchronizing marks on electronic maps displayed on a first electronic device and a second electronic device. The first electronic device and the second electronic device are, for example, automobile computers comprising Car PC, positioning devices comprising navigation device, or handheld electronic devices comprising cellular phones, Personal Digital Assistants (PDAs), PDA phones, digital cameras, music players, or game devices, which are installed or configured with electronic maps. The method comprises steps as follows.

First, the first electronic device receives an input signal input by a user and draws a mark on an electronic map displayed thereon accordingly (step S110). The user may draw a mark, such as a marking line, a marking sign, or an icon on a touch screen of the first electronic device so as to convey a message to a user of the other end.

Figure 2:
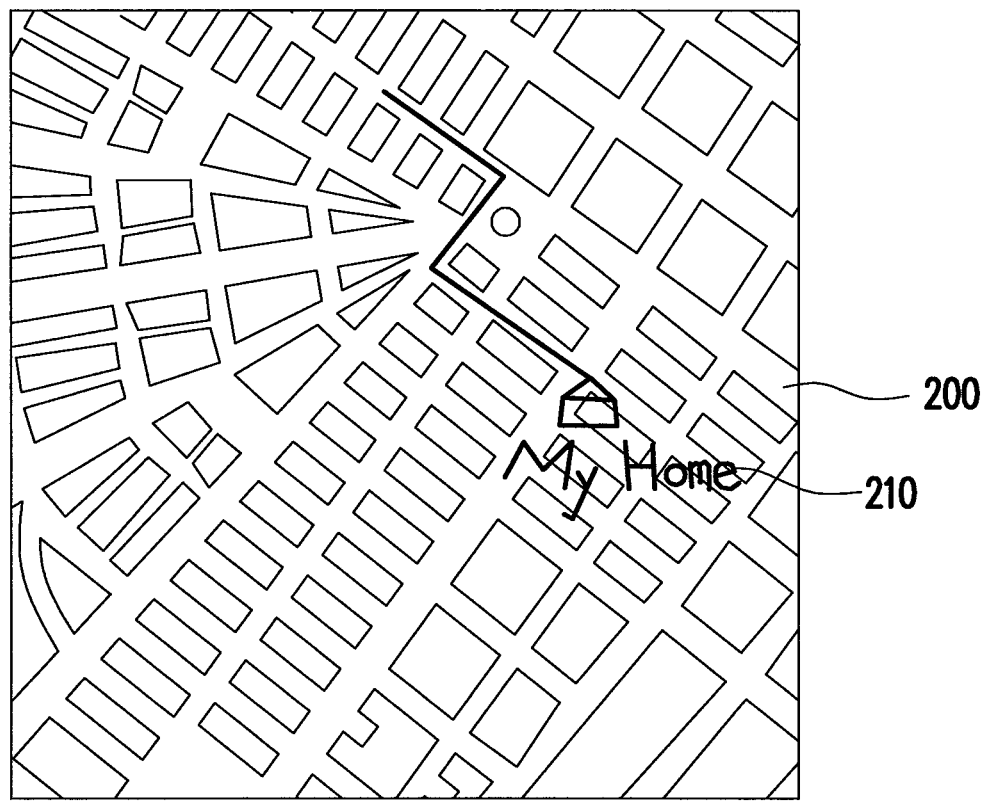
FIG. 2 illustrates an example of the method for synchronizing marks on electronic maps based on an example of the present application.

For example, FIG. 2 illustrates an example of the method for synchronizing marks on electronic maps based on an example of the present application. Referring to FIG. 2, the user draws, for example, a route from a school back to home on the electronic map 200 and draws a mark 210 as a destination of the route, i.e., My Home. The mark 210 may be a simple mark of any type or in any format, which is not limited to.

Then, the first electronic device converts the mark into positioning information of a plurality of positioning points (step S120). Referring to FIG. 2, the mark drawn on the electronic map by the user is considered as a collection of a plurality of positioning points on the electronic map, regardless of length, thickness, or even superficies of the mark. Hence, only positioning information of all points the make passes through is required to be recorded by the first electronic device to complete the conversion of the mark on the electronic map.

The first electronic device transmits the converted positioning information to the second electronic device via a wireless transmission network (step S130), wherein the positioning information is used for drawing the positioning points on the electronic map displayed on the second electronic device. The wireless transmission network is, for example, infrared ray, radio, bluetooth, Wireless Fidelity (Wi-Fi), Global System for Mobile Communication (GSM), Personal Handy-phone System (PHS), or Code Division Multiple Access (CDMA), but not limited to them.

When the second electronic device receives the positioning information, it draws the positioning points on the electronic map displayed thereon so that the mark originally drawn by the user of the first electronic device is reconstructed (step S140). The electronic map comprising the mark may be captured by the second electronic device and saved as a geo-picture for further reference.

It should be noted that when the second electronic device reconstructs the mark, the drawn mark may be too small or out of range of a display area of the electronic map due to the display area or scaling ratio thereof differing from those of the electronic map of the first electronic device. Thus, the display area and the scaling ratio of the electronic map may be optimally adjusted so as to achieve synchronization of marks on electronic maps.

The simplest condition is that the first electronic device only transmits the positioning information of the positioning points corresponding to the mark. Meanwhile, the second electronic device adjusts the size of the displayed electronic map based on the positioning information itself so that a display area of the electronic map can cover the positioning points corresponding to the positioning information. Then, the positioning points are drawn on the adjusted electronic map so as to reconstruct the mark.

Figure 3:
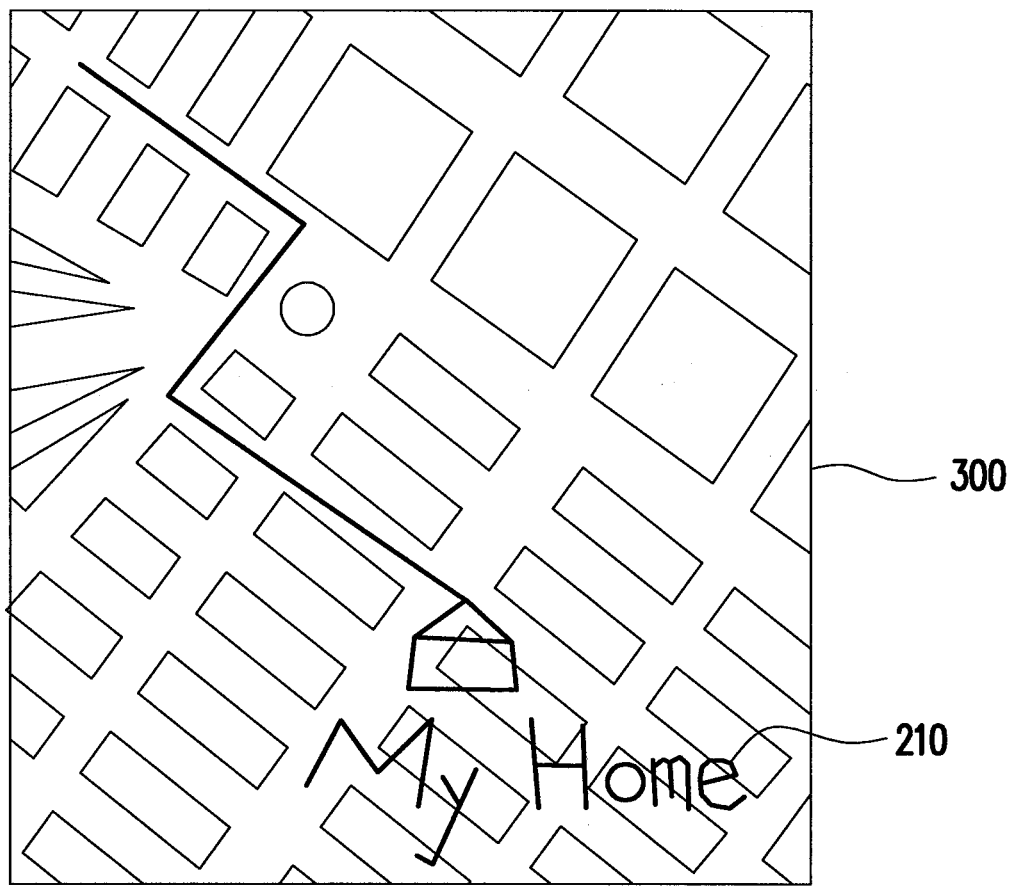
FIG. 3 illustrates an example of the method for synchronizing marks on electronic maps based on an example of the present application.

For example, FIG. 3 illustrates an example of the method for synchronizing marks on electronic maps based on an example of the present application. Referring both FIGS. 2 and 3, it is assumed that the mark 210 on the electronic map 200 is drawn by a user of the first electronic device. For the information transmitted to the second electronic device, only the positioning information of positioning points corresponding to the mark 210 is provided, such that the second electronic device can only use the positioning information itself to adjust a display area and a scaling ratio of an electronic map 300 accordingly. Since the mark 210 only occupies a small part of the electronic map 200, the electronic map 300 adjusted by the second electronic device looks like the area of the electronic map 200 covering the mark 210 is enlarged.

Certainly, to unify the display areas and the scaling ratios of both communication ends, the display area and the scaling ratio of the electronic map displayed on the first electronic device are also required to be transmitted to the second electronic device so as to adjust the ratio of the electronic map and reconstruct the mark accordingly. Examples where only a scaling ratio is transmitted, and where coordinates of the center point and a scaling ratio are transmitted will be described hereinafter, respectively.

Figure 4:
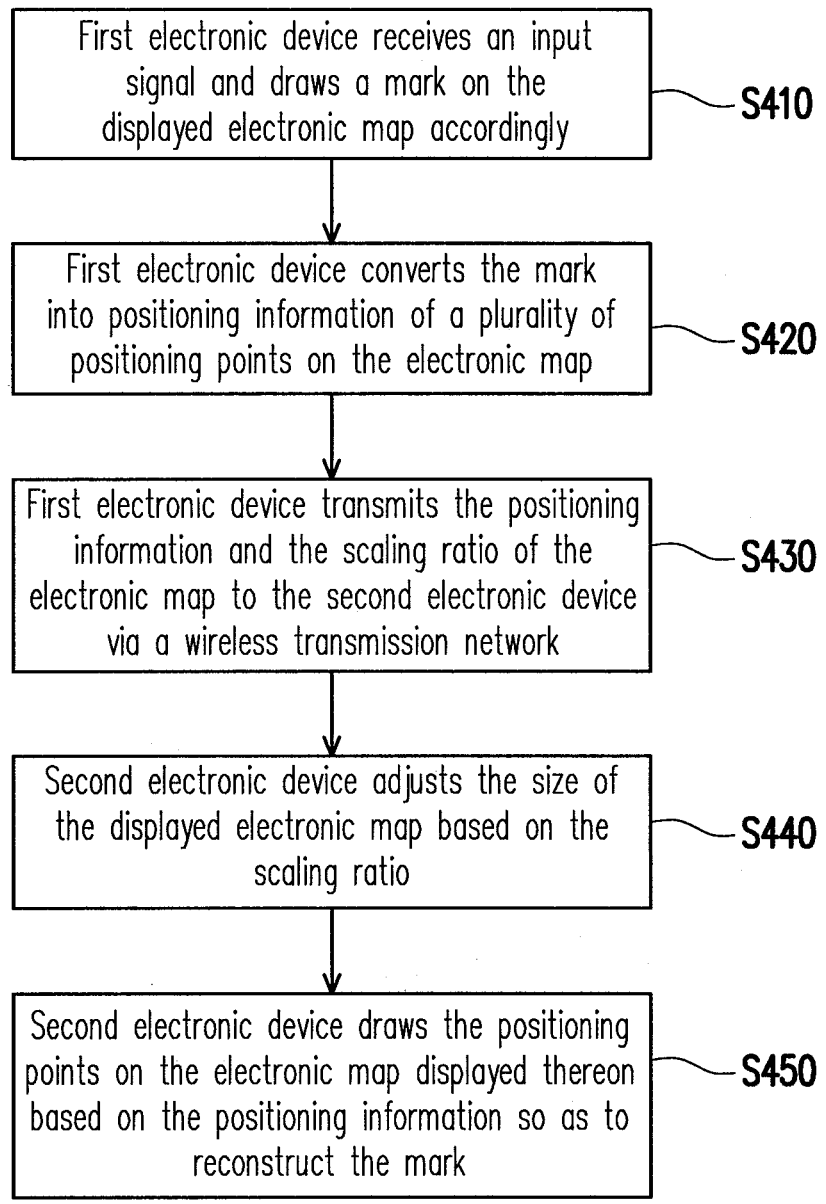
FIG. 4 is a flowchart illustrating a method for synchronizing marks on electronic maps based on an example of the present application.

FIG. 4 is a flowchart illustrating a method for synchronizing marks on electronic maps based on an example of the present application. Referring to FIG. 4, the present example is adapted to synchronizing a scaling ratio of electronic maps and marks on the electronic maps displayed on a first electronic device and a second electronic device. The first electronic device and the second electronic device are, for example, automobile computers comprising Car PC, positioning devices comprising navigation device, or handheld electronic devices comprising cellular phones, PDAs, PDA phones, digital cameras, music players, or game devices, which are installed or configured with electronic maps. The method comprises steps as follows.

First, the first electronic device receives an input signal input by a user and draws a mark on the displayed electronic map accordingly (step S410). Then, the first electronic device converts the mark into positioning information of a plurality of positioning points (step S420). The previously described steps of S410 to S420 are identical or similar to the steps of S110 to S120 in the above examples, and will not be described herein again.

It should be noted that when the first electronic device transmits the positioning information to the second electronic device, it further transmits a scaling ratio of the displayed electronic map to the second electronic device (step S430). When the second electronic device receives the positioning information, it adjusts the size of the displayed electronic map based on the scaling ratio (step S440). Then, the second electronic device draws the positioning points corresponding to the positioning information on the adjusted electronic map so as to reconstruct the mark drawn by the user of the first electronic device (step S450).

It should be noted that in the present example, the scaling ratio of the electronic map of the second electronic device is adjusted to be identical to that of the electronic map of the first electronic device. However, since the position of the center point of the original electronic map is unknown, a geometric center of the mark or a final position of the mark is used as a center of the electronic map to adjust the display area of the electronic map.

Figure 5:
FIG. 5 illustrates an example of the method for synchronizing marks on electronic maps based on an example of the present application.

For example, FIG. 5 illustrates an example of the method for synchronizing marks on electronic maps based on an example of the present application. Referring both FIGS. 2 and 5, as configured in the above, the mark 210 on the electronic map is drawn by the user of the first electronic device, and in the information transmitted to the second electronic device, only the positioning information of the positioning points corresponding to the mark 210 and the scaling ratio of the electronic map are provided. Therefore, although the second electronic device may adjust the scaling ratio of the electronic map to be identical to that of the original electronic map, it can only use a center of the mark 210 as the center point of an electronic map 500 so as to adjust a display area of the electronic map 500. Hence, based on a same display resolution, the electronic map 500 adjusted by the second electronic device seems to move the part comprising the mark 210 in the electronic map 200 to the center of the electronic map 200.

Figure 6:
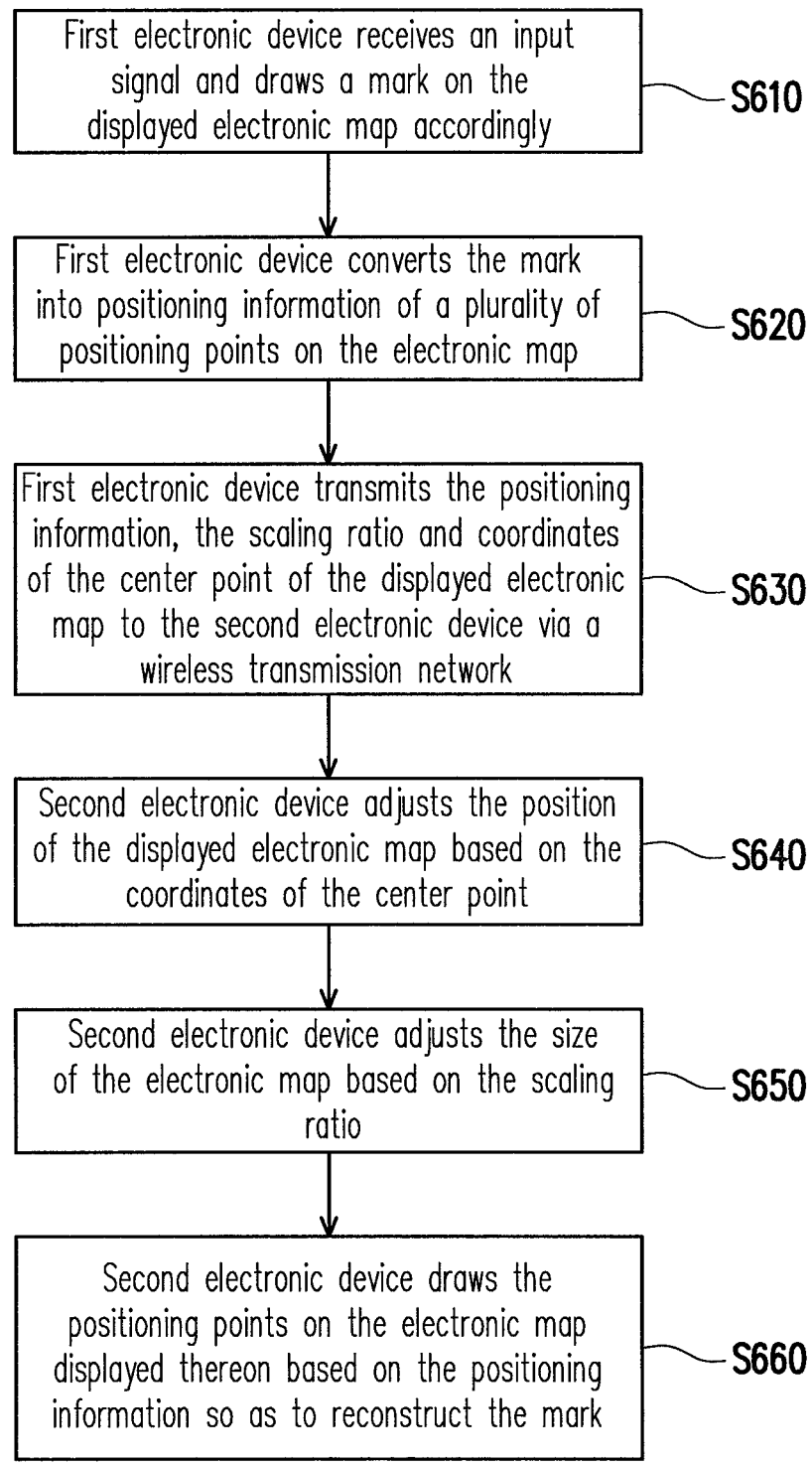
FIG. 6 is a flowchart illustrating a method for synchronizing marks on electronic maps based on an example of the present application.

FIG. 6 is a flowchart illustrating a method for synchronizing marks on electronic maps based on an example of the present application. Referring to FIG. 6, the present example is adapted to synchronizing display areas, scaling ratios and displayed marks of electronic maps displayed on a first electronic device and a second electronic device. The first electronic device and the second electronic device are, for example, automobile computers comprising Car PC, positioning devices comprising navigation device, or handheld electronic devices comprising cellular phones, PDAs, PDA phones, digital cameras, music players, or game devices, which are installed or configured with electronic maps. The method comprises steps as follows.

First, the first electronic device receives an input signal input by a user and draws a mark on the displayed electronic map accordingly (step S610). Then, the first electronic device converts the mark into positioning information of a plurality of positioning points (step S620). The previously described steps of S610 to S620 are identical or similar to the steps of S110 to S120 in the above examples, and will not be described herein again.

It should be noted that when the first electronic device transmits the positioning information to the second electronic device, it further transmits a scaling ratio and coordinates of the center point of the displayed electronic map to the second electronic device (step S630). When the second electronic device receives the information, it adjusts the position of the displayed electronic map based on the coordinates of the center point (step S640). Then, the second electronic device further adjusts the size of the electronic map based on the scaling ratio (step S650). Finally, the second electronic device draws the positioning points corresponding to the positioning information on the adjusted electronic map so as to reconstruct the mark originally drawn by the user of the first electronic device (step S660).

In the present example, with synchronizing the coordinates of the center point and the scaling ratio of the electronic maps of both ends, the electronic map and the mark displayed on the second electronic device is identical to the electronic map and the mark originally displayed on the first electronic map, so that synchronization of marks on electronic maps are achieved.

For the synchronizing method described as the above, the present application also provides a synchronization system corresponding thereto. Through a communication between the first and second electronic devices, the marks on the electronic maps of both ends are synchronized. An example is illustrated hereinafter.

Figure 7:
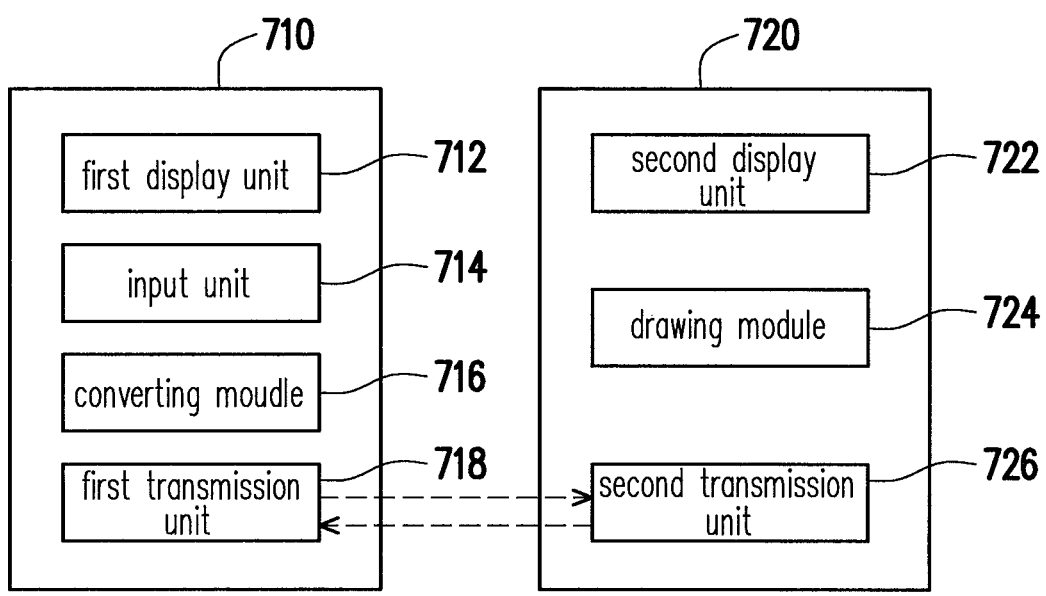
FIG. 7 is a block diagram illustrating a system for synchronizing marks on electronic maps based on an example of the present application.

FIG. 7 is a block diagram illustrating a synchronization system for marks on electronic maps based on an example of the present application. Referring to FIG. 7, a synchronization system 700 of the present example comprises a first electronic device 710 and a second electronic device 720. The first electronic device 710 and the second electronic device 720 are, for example, automobile computers comprising Car PC, positioning devices comprising navigation device, or handheld electronic devices comprising cellular phones, PDAs, PDA phones, digital cameras, music players, or game devices, which are installed or configured with electronic maps. The functions thereof are described as follows.

The first electronic device 710 comprises a first display unit 712, an input unit 714, a converting module 716, and a transmission unit 718. The first display unit 712 is used to display a first electronic map. The input unit 714 is used to receive an input signal input by a user so as to draw a mark on the first electronic map. The input unit 714 is, but not limited to, a touch panel, a touch pad, a keyboard, a track ball, a joystick, or a mouse comprising an optical mouse.

The converting module 716 is used to convert the mark into positioning information of a plurality of positioning points on the first electronic map. In brief, the converting module 716 converts the mark drawn by the user on the electronic map into a collection of a plurality of positioning points on the electronic map. With recording the positioning information of all points the mark passes through, conversion of the mark on the electronic map is completed.

The first transmission unit 718 is used to output the positioning information of the positioning points via a wireless transmission network, wherein the positioning information of the positioning points is used for drawing the positioning points on a second display unit 722 of the second electronic device 720. The wireless transmission network is, for example, infrared ray, radio or bluetooth, or alternatively, hot spots of Wireless Fidelity (Wi-Fi), Global System for Mobile Communication (GSM), Personal Handy-phone System (PHS), or Code Division Multiple Access (CDMA).

On the other hand, the second electronic device 720 comprises a second display unit 722, a drawing module 724, and a second transmission unit 726. The second display unit 722 is used to display a second electronic map. The second transmission unit 726 communicates with the first transmission unit 718 of first electronic device 710 via the wireless transmission network, and receives the positioning information of the positioning points output from the first electronic device 710. Certainly, the transmission unit 726 is required to adopt the same wireless transmission network of the first transmission unit 718 so as to proceed with data transmission.

The drawing module 724 is used to draw the positioning points on the second electronic map displayed on the second display unit 722 based on the positioning information received by the second transmission unit 726 so as to reconstruct the mark. The second electronic map comprising the mark is captured by a capturing module (not shown) and saved as a geo-picture for further reference.

It should be noted that the first electronic device 710 is further used to transmit the information, such as the coordinates of the center point and a scaling ratio of the electronic map thereof to the second electronic device 720 via the first transmission unit 718 so as to synchronize the display areas and the scaling ratios of the electronic maps of both ends so that synchronization of marks on electronic maps of the present application is achieved. The related content is described in the above examples, thus will not described herein again.

The present application further provides a recording medium, which records a computer program to be loaded into an electronic device to execute the method for synchronizing marks on the electronic maps. The computer program is consisted of a plurality of program code segments, such as program code segments of creating organization chart, signing forms, configuration, and deployment. Then, when the program code segments are loaded into the electronic device and executed, the steps of the method for synchronizing marks on the electronic maps and functions of the system for synchronizing marks on the electronic maps are executed.

In view of the foregoing, the method and the system for synchronizing marks on electronic maps and the recording medium using the same of the present application regards the mark drawn by a user as a collection of a plurality of positioning points and converts the same into positioning information. Moreover, the positioning information, coordinates of the center point and a scaling ratio of the electronic map are transmitted to another end so as to adjust the size and the position of the electronic maps and reconstruct the mark. Accordingly, synchronization of scaling ratios of electronic maps of both ends is achieved.

Although the present application has been disclosed by the above examples, they are not intended to limit the present application. Those skilled in the art may make some modifications and alterations without departing from the spirit and scope of the present application. Therefore, the protection range of the present application falls in the appended claims.

What is claimed is:

1. A method for synchronizing drawn marks on electronic maps, adapted for synchronizing a drawn mark between an electronic map displayed on a touch screen of a first handheld mobile electronic device and an electronic map displayed on a touch screen of a second handheld mobile electronic device, and the steps of the synchronizing method comprising:
   pre-configuring the electronic map with a plurality of positioning points;
   receiving an input signal by the touch screen of the first electronic device and drawing the mark on the displayed electronic map accordingly, wherein the input signal is generated in response to the user drawing the mark on the electronic map displayed on the touch screen, and wherein the mark is asymmetrically shaped and comprises a marking line, a marking sign, an icon, or text drawn by the user on the touch screen;
   converting the mark into one or more lines of serial positioning points corresponding to the drawn mark on the electronic map;
   transmitting the positioning points to the second electronic device via a wireless transmission network, wherein the positioning points transmitted to the second electronic device is used for drawing the corresponding drawn mark on the electronic map displayed on the second electronic device so as to reconstruct the mark sent from the first electronic device; and
   adjusting the size of the electronic map displayed on the second electronic map to display the mark of all of the transmitted position points, and wherein the transmitted positioning points comprise a geometric center of the mark, used as the center of the displayed electronic map on the second electronic device.

2. The method according to claim 1, further comprises:
   transmitting a scaling ratio of the electronic map displayed on the first electronic device to the second electronic device, wherein the scaling ratio is used for further adjusting the size of the displayed electronic map on the second electronic device.

3. The method according to claim 1, further comprises:
   transmitting coordinates of the final point of the electronic map displayed on the first electronic device to the second electronic device, wherein the coordinates of the final point is used for further adjusting the position of the displayed electronic map on the second electronic device.

4. The method according to claim 1, wherein the size of the displayed electronic map on the second electronic device is further adjusted based on the positioning information so that a display area of the electronic map covers all of the positioning points corresponding to the positioning information.

5. The method according to claim 1, further comprises:
   capturing the electronic map comprising the mark and saving the same as a geo-picture.

6. A recording medium, executing a method for synchronizing marks on electronic maps adapted for synchronizing a drawn mark between an electronic map displayed on a touch screen of a first handheld mobile electronic device and an electronic map displayed on a touch screen of a second handheld mobile electronic device, and the steps of the synchronizing method comprising:
   pre-configuring the electronic map with a plurality of positioning points;
   receiving an input signal by the touch screen of the first electronic device and drawing the mark on the displayed electronic map accordingly, wherein the input signal is generated when the user draws the mark on the electronic map displayed on the touch screen, and wherein the mark is asymmetrically shaped and comprises a marking line, a marking sign, an icon, or text drawn by the user on the touch screen;

converting the mark into one or more lines of serial positioning points corresponding to the drawn mark on the electronic map;

transmitting the positioning points to the second electronic device via a wireless transmission network, wherein the positioning points transmitted to the second electronic device is used for drawing the corresponding drawn mark on the electronic map displayed on the second electronic device so as to reconstruct the mark identically from the first electronic device; and adjusting the size of the electronic map displayed on the second electronic map to display the mark of all of the transmitted position points, wherein the transmitted positioning points comprise a geometric center of the mark used as the center of the displayed electronic map on the second electronic device.

7. A system for synchronizing drawn marks on electronic maps, comprising:

a first handheld mobile electronic device, comprising:
　a first display unit, displaying a first electronic map on a touch screen, wherein the electronic map is pre-configured with a plurality of positioning points;
　an input unit, receiving an input signal by the touch screen so as to draw a mark on the first electronic map, wherein the input signal is generated when the user draws the mark on the electronic map displayed on the touch screen, and wherein the mark is asymmetrically shaped and comprises a marking line, a marking sign, an icon, or text drawn by the user on the touch screen;
　a converting module, converting the drawn mark into one or more lines of serial positioning points corresponding to the drawn mark on the first electronic map; and
　a first transmission unit, outputting the positioning points via a wireless transmission network, wherein the transmitted positioning points comprise a geometric center of the mark; and a second handheld mobile electronic device, comprising:
　a second display unit, displaying a second electronic map on a touch screen;
　a second transmission unit, receiving the one or more lines of serial positioning points corresponding to the drawn mark from the first electronic device via the wireless transmission network; and
　a drawing module, drawing the corresponding one or more lines of serial positioning points on the second electronic map displayed on the second display unit so as to reconstruct the mark sent from the first electronic device; and adjusting the size of the electronic map displayed on the second electronic map to display the mark of all of the transmitted position points based on the geometric center of the mark used as the center of the displayed electronic map on the second electronic device.

8. The system according to claim 7, wherein
the first transmission unit further transmits a scaling ratio of the first electronic map to the second electronic device; and
the drawing module further adjusts the size of the displayed second electronic map based on the scaling ratio.

9. The system according to claim 7, wherein the transmitted positioning points further comprises a final position of the mark and the drawing module further adjusts the position of the displayed second electronic map based on the final position of the mark used as the coordinates of the center point.

10. The system according to claim 7, wherein the drawing module further adjusts the size of the second electronic map so that a display area of the second electronic map covers all of the positioning points of the positioning information.

11. The system according to claim 7, wherein the second electronic device further comprises:
　a retrieving module, capturing the second electronic map comprising the mark and saving the same as a geo-picture.

12. The system according to claim 7, wherein the mark comprises marking lines, signs or icons drawn by a user.

13. An handheld mobile electronic device for synchronizing drawn marks on electronic maps with the other hand mobile electronic device, comprising:
　a display unit, displaying a first electronic map on a touch screen, wherein the electronic map is pre-configured with a plurality of positioning points;
　an input unit, receiving an input signal by the touch screen so as to draw a mark on the first electronic map, wherein the input signal is generated when the user draws the mark on the electronic map displayed on the touch screen, and wherein the mark is asymmetrically shaped and comprises a marking line, a marking sign, an icon, or text drawn by the user on the touch screen;
　a converting module, converting the drawn mark into one or more lines of serial positioning points corresponding to the drawn mark on the first electronic map; and
　a transmission unit, outputting the positioning information of the positioning points via a wireless transmission network to the other electronic device, wherein the one or more lines of serial positioning points transmitted to the other electronic device is used for drawing the corresponding drawn mark on the electronic map displayed on the other electronic device so as to reconstruct the mark from the electronic device; and the transmission unit further outputting a geometric center of the mark via a wireless transmission network to the other electronic device to adjust the size of an electronic map displayed on a touch screen of the other electronic device to display the mark of all of the transmitted position points, wherein the geometric center of the mark is used as the center of the displayed electronic map of the other electronic device.

14. The electronic device according to claim 13, wherein the transmission unit further transmits a scaling ratio of the first electronic map to the other electronic device for further adjusting the size of the electronic map on the other electronic device.

15. The electronic device according to claim 13, wherein the transmitted positioning points further comprises a final position of the mark for further adjusting the position of the electronic map displayed on the other electronic device.

16. The electronic device according to claim 13, wherein the size of the electronic map displayed on the other electronic device is further adjusted so that a display area of the electronic map displayed on the other electronic device covers all of the positioning points of the positioning information.

17. The electronic device according to claim 13, wherein the electronic device further comprises:

a retrieving module, capturing the first electronic map comprising the mark and saving the same as a geo-picture.

18. The electronic device according to claim 13, wherein the electronic map displayed on the other electronic device is further captured and saved as a geo-picture comprising the mark.

19. The electronic device according to claim 13, wherein the mark comprises marking lines, signs, or icons drawn by a user.

20. The system according to claim 7, wherein the first electronic device further comprises:
a retrieving module, capturing the first electronic map comprising the mark and saving the same as a geo-picture.

* * * * *